United States Patent [19]

Bousquet et al.

[11] 4,409,130

[45] Oct. 11, 1983

[54] PROCESS FOR IMPROVING THE STABILITY OF CATALYSTS FOR THE CATALYTIC HYDROTREATMENT OF PETROLEUM CUTS

[76] Inventors: Jacques Bousquet, 2 Rue de la Carriere, 69540 Iricny; Claude Gueguen, Le Cayet, 38780 Septeme Pont l'Eveque; Daniel Vautier, 28 Rue des Fleurs, 69360 Serezin du Rhone, all of France

[21] Appl. No.: 343,454

[22] Filed: Jan. 28, 1982

Related U.S. Application Data

[62] Division of Ser. No. 258,321, Apr. 28, 1981, Pat. No. 4,363,719.

[30] Foreign Application Priority Data

May 8, 1980 [FR] France ............................... 80 10307

[51] Int. Cl.$^3$ .............................................. B01J 21/12
[52] U.S. Cl. .................................... 502/211; 502/254

[58] Field of Search ................................... 252/455 R

[56] References Cited

U.S. PATENT DOCUMENTS 4,139,493  2/1979  Mickelson ...................... 252/455 R
4,212,771  7/1980  Hamner .......................... 252/455 R
4,238,316  12/1980  Mooi et al. ..................... 252/455 R Primary Examiner—Carl F. Dees
Attorney, Agent, or Firm—Burgess, Ryan & Wayne

[57]    ABSTRACT

The invention relates to a process to improve the stability of a catalyst to be used for lowering the cloud or turbidity point and the filterability limit temperature of gas-oils.

The catalyst is formed of a composite system constituting 5 to 90% of a hydrodesulfuration type catalyst A and 95 to 10% of a hydroconversion type catalyst B, these two catalysts being either mixed or superposed, in which case catalyst A forms the top of the catalytic bed.

7 Claims, No Drawings

PROCESS FOR IMPROVING THE STABILITY OF CATALYSTS FOR THE CATALYTIC HYDROTREATMENT OF PETROLEUM CUTS

CROSS-REFERENCE TO RELATED APPLICATION

This application is a divisional of co-pending application Ser. No. 258,321, filed Apr. 28, 1981, now U.S. Pat. No. 4,363,719.

BACKGROUND OF THE INVENTION

This invention relates to improving the stability of a catalyst used to lower the cloud or turbidity point and the filterability limit temperature of gas oils.

It is already known, according to J. E. Marechal (VIth Petroleum Conference Section III paper 1 PD 7) that pouring problems arising from cold temperature resistance of petroleum cuts, and especially gas oils, are bound to the content of long chain linear paraffins (heavy n-paraffins) in said cuts. The aim of the invention is to treat hydrocarbon petroleum cuts containing paraffins, or, being themselves pure or mixed paraffins.

Straight run distillation gas oils contain a high proportion of $C_{12}$–$C_{23}$ n-paraffins. The heaviest cuts can contain longer $C_{12}$–$C_{30}$ paraffin chains. These hydrocarbon petroleum cuts can be gas oils whose initial distillation point is generally at least equal to 150° C. and whose final distillation point, usually set at 455° C., may reach 530° C. when the cuts are obtained by distillation under vacuum.

In the latter case, lubricants can be obtained from these cuts, provided a previous treatment is carried out for eliminating the aromatic compounds by hydrorefining or solvent stripping. The problem thus consists in lowering the pour point of the product obtained, without significantly decreasing its viscosity index while ensuring a yield suitable for the operation. Pour point of lubricants is defined by AFNOR 60105 standard. As regards the gas oils, these must, in order to satisfy commercial quality requirements, fulfill engine gas oils and domestic fuel specifications. Bearing this in mind, it must be noted that the most restrictive characteristics are the sulfur content and pour characteristics.

The pour characteristics most widely used for gas-oils are the pour point and turbidity point (T.P.) defined according to AFNOR T 60105 standard and the filterability limit temperature (FLT) defined according to AFNOR N 07042 standard.

Various treatments can be carried out so that straight run gas-oil cuts comply with said specifications.

When the sulfur content is too high, it is usual to carry out a desulfuration treatment in the presence of hydrogen. This treatment is a catalytic hydrodesulfuration (HDS) obtained by contact with a Cobalt-Molybdenum type catalyst supported on alumina. But this type of treatment does not enable the pour properties of treated petroleum cuts to be improved.

Two solutions are therefore possible:
the first solution, the efficiency of which is however limited, consists in the use of additives;
the second consists in proceeding with a catalytic hydrotreatment called dewaxing or hydroconversion.

The catalysts used in certain hydroconversion processes are constituted by cobalt or molybdenum metallic sulfides, for example, on an acid support which thus no longer only consists in alumina. These processes involve parallel desulfuration and hydroconversion reactions. The reaction mechanism of this type of catalyst causes three types of reaction to occur:
catalysed hydrogenolysis reactions of C-S links by metallic sulfides;
hydrocracking and hydroisomerisation reactions of paraffins occuring on contact with the acid sites of the catalyst;
reactions—alas, inevitable—of coke formation (polymerisation, cyclisation, condensation) on the acid support.

It is this second type of reaction which causes the improvement of the cold temperature pour properties of petroleum cuts by conversion of n-paraffins.

As regards the third type of reaction, it results in a poor stability catalyst with time which manifests itself as a rapid decrease in the speed of the principal reactions thus making it necessary to rapidly increase the temperature of the reactor.

SUMMARY OF THE INVENTION

The aim of the present invention is to improve the stability of the catalyst used in hydrotreatment processes of petroleum cuts in order to enable the turbidity point and the filterability limit temperature of these cuts to be lowered.

The invention consists in the use of a composite catalytic system constituted of two parts:
a hydrodesulfuration catalyst A constituted by a metal from Group VI and a metal from Group VIII of the Periodic Table placed on a non-acid or weak acidity oxide such as pure alumina containing not more than 6% by weight of silica;
a hydroconversion catalyst B constituted by a metal from Group VI and a metal from Group VIII of the Periodic Table on a synthetic or natural silica-alumina type support having a certain acidity, e.g. a silica-alumina support having a silica content higher than 5% by weight.

The hereinabove defined catalytic system comprises from 5 to 90% of catalyst A and from 95 to 10% of catalyst B. Said system is preferably constituted from 10 to 50% hydrodesulfuration type catalyst A and 90 to 50% conversion catalyst B. The solids can be mixed or superposed, in which latter case catalyst A is used at the top of the catalytic bed.

The use of such composite catalytic systems thus allows the lengthening of the cycle duration in processes for improving the pour properties of petroleum cuts, especially gas-oils. Operating conditions are those usually employed in hydroconversion processes.

The average temperature of the reactor is comprised between 300° and 500° C. and more usually between 350° and 450° C.

The hourly liquid space velocity of the feed (HSLV) expressed by a m³/m³/h (m³ of liquid feed per hour and per m³ of catalyst) is usually comprised between 0.2 and 6 h$^{-1}$.

The total pressure prevailing in the reaction zone is generally comprised between 1 and 80 bars and more especially between 25 and 50 bars.

The hydrogen/hydrocarbon molar ratio is comprised between 2 and 10.

The invention is illustrated by the following examples which in no way limit the scope of said invention.

The feeds used are gas-oil petroleum cuts. The characteristics of these gas-oils are given in TABLE I below, but the invention extends its scope to other petroleum cuts containing n-paraffins.

TABLE I

|  | GAS-OIL 1 | GAS-OIL 2 |
|---|---|---|
| Density at 15° C. | 0.875 | 0.850 |
| Sulfur (% weight) | 1.84 | 1.43 |
| F.L.T. (°C.) | +14 | +4 |
| T.P. (°C.) | +20 | +8 |
| ASTM Distilllation |  |  |
| P I | 252 (°C.) | 201 (°C.) |
| 5% | 282 | 227 |
| 50% | 355 | 297 |
| 95% | 433 | 366 |
| Loss on ignition | 442 | 373 |

F.L.T. § Filterability limit temperature
T.P. § Turbidity (or cloud) point

EXAMPLE 1

In this example, gas-oil is treated under the following operating conditions:

| total pressure | 30 bars |
|---|---|
| molar $\frac{hydrogen}{hydrocarbon}$ | 4 |
| H.V.V. | $1\ h^{-1}$ |
| temperature between | 390 and 450° C. |

The above conditions call for a hydrogen pressure (24 bars) which is extremely low for this type of reaction, thus facilitating in fact the intervention of strong deactivation reactions by coking of the catalyst. The catalysts used in this example are type B catalysts. They are prepared by dry impregnation of silica-alumina having a variable alumina content of ammonium molybdate and Nickel or Cobalt nitrate.

The thus prepared catalysts are calcined at 500° C. and sulfurized in the reactor according to the processes already described in the prior art. These catalysts present the compositions given in TABLE II.

TABLE II

|  | Co % (weight) | Ni % (weight) | MO (weight) | $SiO_2$ | $Al_2O_3$ |
|---|---|---|---|---|---|
| Catalyst 1 |  | 4 | 11 | 60 | 40 |
| 2 | — | — |  | 40 | 60 |
| 3 | — | — |  | 25 | 75 |
| 4 | — | — |  | 10 | 90 |
| 5 | 4 | 0 | — | 25 | 75 |

The activity of the catalysts is expressed by the obtained desulfuration rates (HDS) as well as the corresponding drop in both filterability limit temperature (Δ FLT) and turbidity point (Δ TP).

The drop is measured in °C. by the difference between the values corresponding to the feed and the liquid effluent. The results are given in TABLE III as a function of the duration of the test and the temperature of the reaction. In order to maintain the catalyst performances constant (Δ FLT and Δ TP), the temperature is adjusted in function of time. This therefore leads to express in °C. per day the deactivation speed with regard to Δ FLT and Δ PT).

TABLE III

| Catalyst n° | on time (days) | temperature | HDS % | Δ FLT | Δ TP | Deactivation in °C./days |
|---|---|---|---|---|---|---|
| 1 | to 10th d | 410 | 80 | 5 | 4 | 0.83 |
|  | 20th | 425 | 75 | 6 | 5 |  |
|  | 40th | 435 | 73 | 6 | 5 |  |
| 2 | 80th | 415 | 80 | 6 | 6 | 0.6 |
|  | 90th | 420 | 75 | 7 | 6 |  |
|  | 120th | 440 | 75 | 6 | 5 |  |
| 3 | 120th | 415 | 92 | 7 | 6 | 0.30 |
|  | 160th | 430 | 87 | 7 | 6 |  |
|  | 190th | 435 | 82 | 7 | 6 |  |
| 4 | 40th | 410 | 85 | 6 | 5 | 0.33 |
|  | 50th | 420 | 82 | 7 | 6 |  |
|  | 70th | 420 | 80 | 8 | 6 |  |
| 5 | 10th | 410 | 94 | 4 | 5 | 0.3 |
|  | 20th | 410 | 94 | 4 | 5 |  |
|  | 40th | 420 | 92 | 6 | 5 |  |

An analysis of the results given in TABLE III shows that the use as catalysts of metal from Group VI and metal from Group VIII supported on silica-alumina allows efficient improvement of the pour properties of the gas-oils, but it is necessary to increase the reaction temperature with time in order to maintain the catalyst activity constant with regard to the pour properties of the feed.

At the same time, the hydrodesulfuration activity decreases.

EXAMPLE 2

The purpose of this example is to show by way of comparison the improved stability obtained through associating the catalysts of Example I with the conventional hydrodesulfuration catalyst (type A).

The hydrodesulfuration catalyst used is a catalyst commercially available on the market for the hydrodesulfuration of gas-oils, constituted from Co or Ni and Mo suspended on a non acid alumina, i.e. containing less than 6% $SiO_2$, and preferably less than 2%.

In this example, the catalytic bed is constituted by 10% of hydrodesulfuration catalyst (type A) placed in the top of the reactor and 90% of catalyst of Example 1 (catalyst B). (see TABLE IV)

EXAMPLE 3

The association of catalysts A and B in optimum proportions, enabling the prolongation of the life-span of both the desulfuration function and the hydroconversion function, can be explained by a less extensive coking of catalyst B.

It has been possible to verify this hypothesis during oxidizing regeneration of catalyst B alone or of the composite A+B system under identical operating conditions (similar to those mentioned hereinabove) with the same feeds and the same duration.

TABLE IV

| Catalyst n° | on time (days) | temperature | HDS % | Δ FLT | Δ PT | Deactivation in °C./days |
|---|---|---|---|---|---|---|
| 90% 1 + 10% A | to 10th d | 415 | 85 | 9 | 5 | 0.2 |
|  | 30 | 425 | 86 | 6 | 5 |  |
|  | 60 | 425 | 84 | 6 | 6 |  |
| 90% 2 + 10% A | 10 | 415 | 85 | 6 | 5 | 0 |
|  | 30 | 415 | 82 | 6 | 6 |  |
|  | 60 | 415 | 85 | 7 | 6 |  |
| 90% 3 + 10% A | 190 | 435 | 97 | 7 | 6 | 0.16 |
|  | 230 | 435 | 97 | 8 | 7 |  |
|  | 250 | 445 | 96 | 7 | 6 |  |
| 90% 4 + 10% A | 50 | 410 | 90 | 5 | 5 | 0.15 |

TABLE IV-continued

| Catalyst n° | on time (days) | temperature | HDS % | Δ FLT | Δ PT | Deactivation in °C./days |
|---|---|---|---|---|---|---|
| | 70 | 415 | 91 | 7 | 6 | |
| | 120 | 420 | 91 | 8 | 5 | |
| 90% 5 + 10% A | 10 | 410 | 95 | 4 | 5 | 0 |
| | 20 | 410 | 94 | 3 | 4 | |
| | 40 | 410 | 94 | 4 | 5 | |
| A | 10 | 410 | 98 | 2 | 1 | 0 |
| | 20 | 410 | 96 | 1 | 1 | |
| | 60 | 410 | 94 | 2 | 0 | |

The regeneration is a conventional type regeneration, using an air+nitrogen mixture with an oxygen proportion varying from 3 to 20%. The starting temperature of the regeneration is comprised between 300° C. and 400° C. and the final temperature is between 450° C. and 550° C.

Throughout this operation, care was taken to ensure that at no moment did the temperature in the bed rise above 550° C.

It is noted that in the case of catalyst B alone, the combustion duration is long and the maximum temperature recorded is 530° C. In the case of mixture A+B, the duration necessary for the complete combustion of coke is reduced and the maximum temperature recorded drops by 80° C.

TABLE V

| COMPARED REGENERATIONS | | |
|---|---|---|
| | CATALYST B | CATALYST A + B |
| maximum T° | 530° C. | 450° C. |
| duration | 16 H | 12 H |

After regeneration, the catalytic system was checked to ensure that it contains the same rate of residual carbon.

The invention is not limited to the embodiments shown and described hereinbefore. Many modifications and variants may be envisaged by those skilled in the art within the scope of the invention in the appended claims.

What is claimed is:

1. A process for preparing a catalyst composition which comprises 5-90% of a catalyst containing a metal from each of Group VI and Group VIII of the Periodic Table on a non-acid or weak acid oxide support and 95-10% of a catalyst containing a metal from each of Group VI and Group VIII of the Periodic Table on a silica-alumina support having a silica content greater than 5% by weight, said process comprising forming said first catalyst by impregnating said non-acid or weak acid oxide support with said metal, calcining said impregnated catalyst and sulfurizing said calcined catalyst, forming said second catalyst by impregnating said silica-alumina support with said metal, calcining said second impregnated catalyst and sulfurizing said second calcined catalyst, and combining said first and second catalyst.

2. A catalyst composition made by the process of claim 1.

3. The catalyst composition of claim 1 wherein the amount of said first catalyst is 10-50% and said second catalyst is 90-50%.

4. The catalyst composition of claim 1 wherein said metal is selected from the group consisting of cobalt, nickel and molybdenum.

5. The catalyst composition of claim 1 wherein the support of said first catalyst is alumina having not more than 6% by weight of silica.

6. The catalyst composition of claim 2 further comprising a layer of said first catalyst positioned on top of a layer of said second catalyst.

7. The process of claim 1 wherein the step of combining said first and second catalyst comprises placing a layer of said first catalyst on top of a layer of said second catalyst.

* * * * *

UNITED STATES PATENT AND TRADEMARK OFFICE
CERTIFICATE OF CORRECTION

PATENT NO. : 4,409,130
DATED : October 11, 1983
INVENTOR(S) : Jacques Bousquet et al.

It is certified that error appears in the above-identified patent and that said Letters Patent is hereby corrected as shown below:

On the title page add: -- [73] Assignee: Elf France, Paris, France --.

Signed and Sealed this

Twenty-fourth Day of July 1984

[SEAL]

*Attest:*

GERALD J. MOSSINGHOFF

*Attesting Officer*  *Commissioner of Patents and Trademarks*